United States Patent
Ito

(10) Patent No.: US 6,510,480 B1
(45) Date of Patent: Jan. 21, 2003

(54) DATA TRANSFER CIRCUIT AND DATA PROCESSING METHOD USING DATA TRANSFER CIRCUIT FOR HANDLING INTERRUPTION PROCESSING

(75) Inventor: Hirotaka Ito, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/383,010

(22) Filed: Aug. 25, 1999

(30) Foreign Application Priority Data

Aug. 25, 1998 (JP) .......................................... 10-238988

(51) Int. Cl.⁷ ................................................. G06F 1/13
(52) U.S. Cl. ........................ 710/268; 710/267; 710/262
(58) Field of Search ................................ 710/260, 261, 710/263, 266, 268, 269; 712/4, 5, 41

(56) References Cited

U.S. PATENT DOCUMENTS

| | | | | |
|---|---|---|---|---|
| 5,355,499 A | * | 10/1994 | Murai ........................ | 710/260 |
| 5,581,770 A | * | 12/1996 | Suzuki ....................... | 710/260 |
| 5,659,760 A | * | 8/1997 | Enami ....................... | 710/269 |
| 5,790,872 A | * | 8/1998 | Nozue et al. ............... | 710/267 |
| 5,857,108 A | * | 1/1999 | Hong ......................... | 710/260 |
| 5,931,936 A | * | 8/1999 | Chung et al. ............... | 710/263 |
| 6,072,850 A | * | 6/2000 | Ueno .......................... | 377/47 |
| 6,243,804 B1 | * | 6/2001 | Cheng ........................ | 712/228 |

FOREIGN PATENT DOCUMENTS

JP          8-95801        4/1996

* cited by examiner

Primary Examiner—Peter Wong
Assistant Examiner—Raymond N Phan
(74) Attorney, Agent, or Firm—Wenderoth, Lind & Ponack, L.L.P.

(57) ABSTRACT

A write register access circuit 201 comprises data input terminals $1e01~1e32$, 32 pieces of first-stage flip-flops $1a01~1a32$, 16 pieces of second-stage flip-flops $1b01~1b16$ connected to the first-stage flip-flops $1a01~1a16$, an OR gate $1g$, a flip-flop $1h$, a NAND gate 11, 16 pieces of data selector circuits $1c01~1c16$, 32 pieces of gate circuits $1d01~1d32$, and 32 pieces of data output terminals $1f01~1f32$, and the write register access circuit 201 is connected to a CPU circuit 215 through an interruption request circuit Z. Therefore, when the write register access circuit 201 is included in an LSI, the write register access circuit 201 enables parallel processing between the CPU and the LSI without necessity of matching the instruction word length of the CPU and the bus width of the LSI, providing an internal bus width changing switch, and dealing with the problem at the software end of the CPU. Further, data transfer rate is increased.

24 Claims, 7 Drawing Sheets

Fig.6 (a) Prior Art

DATA TRANSFER CIRCUIT AND DATA PROCESSING METHOD USING DATA TRANSFER CIRCUIT FOR HANDLING INTERRUPTION PROCESSING

FIELD OF THE INVENTION

The present invention relates to a register access circuit used in a microcomputer or the like, and a data processing method in the register access circuit when an interruption request signal is output from an interruption request circuit connected to the register access circuit to a central processing unit.

BACKGROUND OF THE INVENTION

For example, a microcomputer used in a system having a construction as shown in FIG. 7 is composed of a large-scale integrated circuit (hereinafter referred to as an LSI) and a central processing unit (hereinafter referred to as a CPU), and the CPU can access a register inside the LSI via an interface circuit which satisfies a predetermined specification. Further, the CPU is connected to an interruption request circuit from the LSI, although it is not shown in the figure.

First of all, the CPU access to the register will be briefly described. The CPU outputs address information and a write enable signal or a read enable signal to the LSI to request access to the register inside the LSI. Then, the LSI outputs data to the CPU according to the input address information and the write enable signal or the read enable signal. Alternatively, the LSI captures data in the register so that the CPU can read or write the contents of the register inside the LSI.

Next, the operation of the interruption request circuit will be briefly described. The interruption request circuit receives the internal status of the LSI (e.g., end of data processing, generation of an error, a request to the CPU, etc.) as an interruption request signal, from each of circuit blocks inside the LSI. Then, the interruption request circuit appropriately outputs the received interruption request signal to the CPU. In this way, the CPU can know the internal status of the LSI by processing the interruption request signal.

On receipt of the interruption request, the CPU interrupts the processing in progress (main routine) to handle the interruption request. Next, the CPU accesses data decoded in a predetermined address to recognize the cause of the interruption. After recognizing the cause of the interruption, the CPU performs a predetermined process on the LSI. When this process has ended, the CPU clears the interruption cause and returns to the main routine.

However, in the LSI connected to the CPU, there exists a block performing data processing independently of the operation of the CPU. When an error or the like occurs in the data processing performed in this block, this block sometimes outputs an interruption request signal to the CPU independently of the CPU's operation to detect the states of flip-flops.

For example, it is assumed that the instruction word length of the CPU is not equal to the width of an internal bus line of the LSI connected to the CPU, like that the instruction word length of the CPU is 16 bits while the bus width is 32 bits. In this case, when the CPU writes only 16 bits of data in the LSI, if an interruption request signal is output to the CPU from a block performing data processing independently of the operation of the CPU, the CPU performs interruption processing on the LSI. At this time, writing of data to the register has not yet ended because the LSI does not output a write enable signal to the register until 32 bits of data are written in it. That is, register access is undesirably performed although only 16 bits of data are written in the LSI. As the result, the 16 bits of data which have already been written in the LSI are overwritten, and the 16 bits of data are erased.

In this way, even while the CPU accesses the register of the LSI with the result of the CPU's detecting the flip-flop states being "no interruption request", there is a possibility that a block having no relation with the operation of the CPU outputs an interruption request signal to the CPU and, in this case, there occurs a problem that the data which are being written in the LSI are erased.

The above-described problem has conventionally been solved by adopting the following methods: a method of making the bus width of the LSI equal to the instruction word length of the CPU, such as using an LSI whose internal bus width is equal to the instruction word length of the CPU; a method of employing an internal bus width changing switch, such as providing the LSI with an internal bus width changing switch for changing the internal bus width of the LSI according to a variety of instruction word lengths of the CPU; and a method of dealing with the problem at the software end of the CPU, such as providing the CPU with software which gives priority to the main routine of the CPU even when an interrupt request signal is generated and does not perform interruption processing until this main routine is ended.

However, in the method of making the bus width of the LSI equal to the instruction word length of the CPU, it is necessary to change the CPU according to every LSI to be connected and, therefore, the software properties in the past cannot be effectively utilized. Hence, this method is not sufficient to solve the above-mentioned problem.

Further, the method of employing an internal bus width changing switch has the following drawback. Although an ordinary LSI is designed so as to have a wide internal bus width to increase the data transfer rate, if the internal bus width of the LSI is changed according to every instruction word length of the CPU, it is difficult to keep the data transfer at a high rate, resulting in degraded performance of hardware. Further, a circuit block for changing the internal bus width is required, whereby the circuit becomes redundant and, further, the circuit scale increases. Therefore, this method is not sufficient to solve the above-mentioned problem.

In the method of dealing with the problem at the software end of the CPU, the data processing rate is determined by a part of the software where the rate is lowest, and this interferes with parallel processing between the software and the hardware, resulting in difficulty in realizing versatile software. Therefore, this method is not sufficient to solve the problem.

Furthermore, there is a method of continuously making access adapted to the internal bus width of the LSI to avoid the above-mentioned problem. In this method, however, with respect to an interruption request which is input asynchronously, the CPU's recognition of the interruption and the processing thereof are determined not by the instruction word length of the CPU but by the internal bus width of the LSI and, therefore, overhead up to the interruption processing occurs, whereby the interruption processing to the hardware is delayed.

This problem will be described in more detail by using FIGS. 6(a) and 6(b) for explaining overhead of firmware.

Although firmware as shown in FIG. 6(b) is originally desired, actually recognition of interruption delays by a period of overhead as shown in FIG. 6(a). So, when an interruption is generated, the hardware which has outputted the instruction of interruption is in the stopped state until the interruption is recognized, received and processed, and therefore it takes long time until interruption processing is completed. That is, the period during which the hardware is in the stopped state increases, whereby the data transfer rate cannot be increased.

SUMMARY OF THE INVENTION

The present invention is made to solve the above-described problems and has for its object to provide a register access circuit which can maximize the period during which a CPU and an LSI operate in parallel by constructing the register access circuit so that it can rapidly accept and handle interruption processing instructed by hardware, i.e., by reducing the overhead time until the interruption processing, even when the LSI connected to the CPU has a bus width different from the instruction word length of the CPU, and which realizes high-speed data transfer by increasing the data transfer efficiency, without necessity of making the CPU's instruction word length equal to the LSI's bus width, providing an internal bus width changing switch, and dealing with the problem at the CPU's software end such that access adapted to the LSI's internal bus width is continuously performed.

Another object of the present invention is to provide a data processing method using the register access circuit.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a register access circuit comprising, at least, first data holding means having a plurality of data holding circuits; second data holding means having at least one data holding circuit, connected to some of the data holding circuits in the first data holding means; and data output selecting means for selecting data held by some of the data holding circuits in the first data holding means, or data held by some of the data holding circuits in the second data holding means. In this circuit, when an interruption request signal is asserted to the register access circuit, part of the data held by the first data holding means is given to the second data holding means, and when the interruption request signal is negated, the data output selecting means selects the data of the second data holding means to output the data.

According to a second aspect of the present invention, in the above-described register access circuit, when the number of the data holding circuits possessed by the first data holding means is n (n: natural number), the number of the data holding circuits possessed by the second data holding means is one selected from (n/4), (n/2), and (3×n/4).

According to a third aspect of the present invention, in the above-described register access circuit, the number n of the data holding circuits possessed by the first data holding means is 32.

According to a fourth aspect of the present invention, in the above-described register access circuit, the number of the data holding circuits possessed by the second data holding means is 16.

According to a fifth aspect of the present invention, there is provided a register access circuit comprising, at least, 32 pieces of first-stage flip-flops; 16 pieces of second-stage flip-flops connected to 16 pieces of the first-stage flip-flops; 16 pieces of selector circuits for giving part of data held by the first-stage flip-flops to the second-stage flip-flops; a logic gate; and 32 pieces of gate circuits for selecting data held by some of the first-stage flip-flops or data held by some of second-stage flip-flops to output the data. In this circuit, when an interruption request signal is asserted to the register access circuit, part of the data held by the first-stage flip-flops is given to the second-stage flip-flops by using the selector circuits, and when the interruption request signal is negated, the selector circuits select the data held by the second-stage flip-flops and output the data through the gate circuits.

According to the above-described register access circuit of the present invention, even when the instruction word length of a CPU connected to an LSI including the register access circuit is different from the internal bus width of the LSI, data in the LSI is prevented from being erased by interruption processing of the CPU. Further, since the register access circuit of the present invention is provided with the logic circuit which gives the data of the first data holding circuit to the second data holding circuit in response to the interruption request signal and switches the output of the first data holding circuit and the output of the second data holding circuit, there is no necessity of making the CPU's instruction word length equal to the LSI's bus width, providing an internal bus width changing switch, or dealing with the problem at the CPU's software end. So, redundant circuits are dispensed with, resulting in a simple circuit structure. Further, even when the LSI whose bus width is different from the CPU's instruction work length is connected to the CPU, since the register access circuit is constructed so that it can rapidly accept and handle interruption processing instructed by hardware, i.e., since the overhead time until the interruption processing is reduced, parallel processing between the CPU and the LSI is realized and, furthermore, high-speed data transfer is realized.

According to a sixth aspect of the present invention, there is provided a data processing method using a register access circuit, which is employed in a system comprising: a central processing unit; a register circuit; a register access circuit for accessing the register circuit under control of the central processing unit; and an interruption request circuit connected to the central processing unit. The register access circuit comprises, at least, first data holding means having a plurality of data holding circuits; second data holding means having at least one data holding circuit, connected to some of the data holding circuits in.the first data holding means; and data output selecting means for selecting data held by some of the data holding circuits in the first data holding means or data held by some of the data holding circuits in the second data holding means to output the selected data. The data processing method comprises a first step of giving part of the data held by the first data holding means to the second data holding means when the interruption request circuit outputs an interruption request signal to the central processing unit; and a second step of composition the data held by the second data holding means after the first step with part of the data held by the first data holding means which has not yet been connected to the second data holding means, and outputting the composite data, when the central processing unit ends interruption processing according to the interruption request signal.

According to a seventh aspect of the present, invention, in the above-described data processing method using a register access circuit, when the number of the data holding circuits possessed by the first data holding means in the register access circuit is n (n: natural number), the number of the data holding circuits possessed by the second data holding means is one selected from (n/4), (n/2), and (3×n/4).

According to an eighth aspect of the present invention, in the above-described data processing method using a register access circuit, the number n of the data holding circuits possessed by the first data holding means in the register access circuit is 32.

According to a ninth aspect of the present invention, in the above-described data processing method using a register access circuit, the number of data holding circuits possessed by the second data holding means in the register access circuit is 16.

According to a tenth aspect of the present invention, there is provided a data processing method using a register access circuit, which is employed in a system comprising: a central processing unit; a register circuit; a register access circuit accessing the register circuit under control of the central processing unit; and an interruption request circuit connected to the central processing unit. The register access circuit comprises, at least, 32 pieces of first-stage flip-flops; 16 pieces of second-stage flip-flops connected to 16 pieces of the first-stage flip-flops; 16 pieces of selector circuits for giving part of data held by the first-stage flip-flops to the second-stage flip-flops; a logic gate; and 32 pieces of gate circuits for selecting data held by some of the first-stage flip-flops or data held by some of second-stage flip-flops to output the data. The data processing method comprises a first step of giving part of the data held by the first data holding means to the second data holding means when the interruption request circuit outputs an interruption request signal to the central processing unit; and a second step of composition the data held by the second data holding means after the first step with part of the data held by the first data holding means which has not yet been connected to the second data holding means, and outputting the composite data, when the central processing unit ends interruption processing according to the interruption request signal.

According to the above-described data processing method of the present invention, it is possible to prevent malfunction of the CPU's register access when an interruption request is generated during the register access, by utilizing the above-described register access circuit. According to this procedure, even when the instruction word length of the CPU connected to an LSI including the register access circuit is different from the internal bus width of the LSI, data in the LSI is prevented from being erased by interruption processing of the CPU. Further, in the data processing method of the present invention, there is no necessity of making the CPU's instruction word length equal to the LSI's bus width, providing an internal bus width changing switch, or dealing with the problem at the CPU's software, and therefore redundant process steps are dispensed with. Further, even when the LSI whose bus width is different from the CPU's instruction work length is connected to the CPU, since the register access circuit is constructed so that it can rapidly accept and handle interruption processing instructed by hardware, i.e., since the overhead time until the interruption processing is reduced, parallel processing between the CPU and the LSI is realized and, furthermore, high-speed data transfer is realized.

DETAILED DESCRIPTION OF THE PREFERRED EMBODIMENTS

Figure 7:
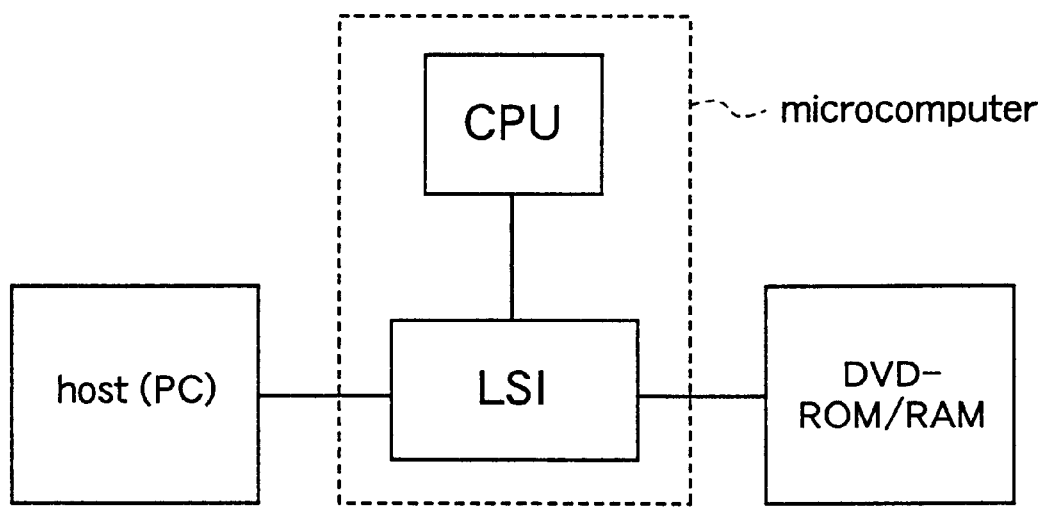
FIG. 7 is a schematic block diagram illustrating an example of a system using a microcomputer.

Hereinafter, embodiments of the present invention will be described with reference to the drawings. The embodiments described hereinafter are merely examples and, therefore, the present invention is not restricted thereto. Further, in the embodiments, it is premised that a microcomputer constructed as shown in FIG. 7 by using an LSI and a CPU is a 16-bit type microcomputer which is presently most popular, but the microcomputer employed in the present invention is not restricted thereto.

[Embodiment 1]

First of all, an example of a register access circuit according to a first embodiment of the present invention will be described with reference to FIG. 1.

Figure 3:
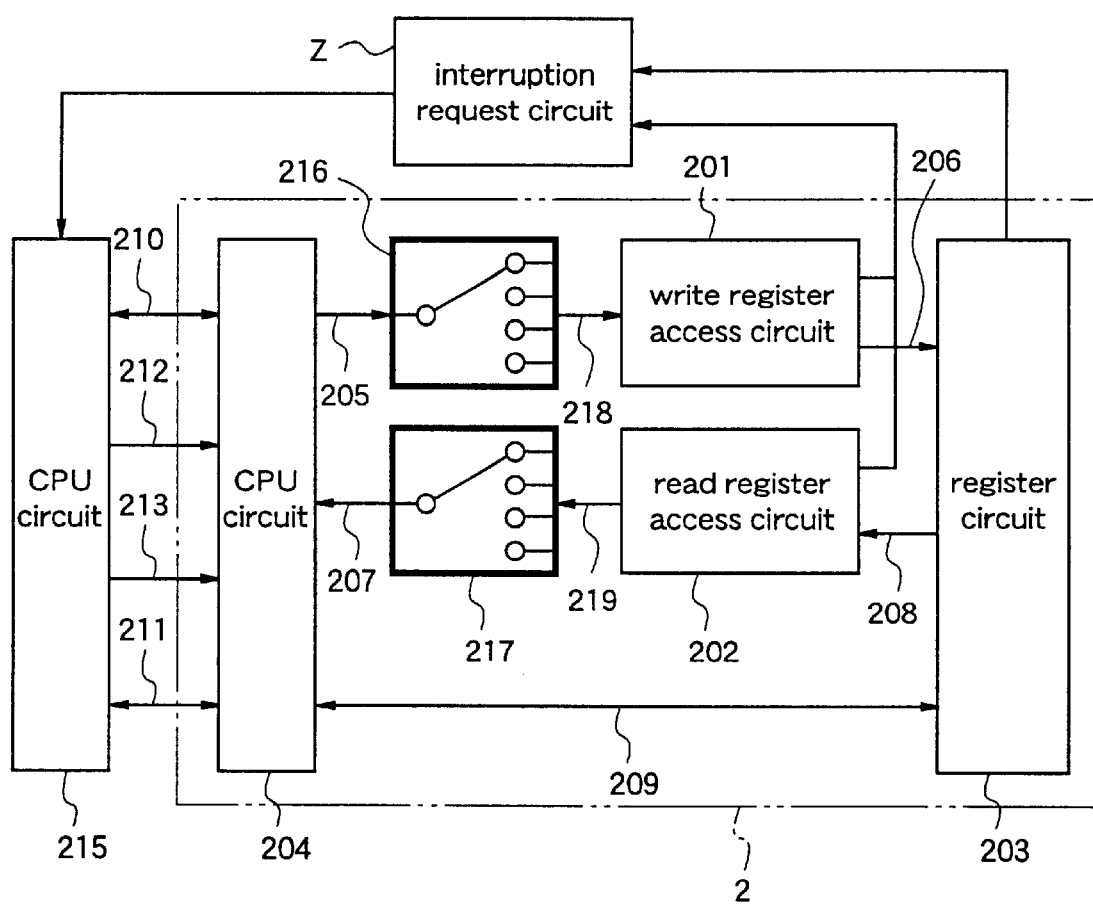
FIG. 3 is a schematic diagram illustrating a system relating to a data processing method using the register access circuit according to the present invention.

A register access circuit 201 according to the first embodiment comprises 32 pieces of data input terminals $1e01$~$1e32$, 32 pieces of first-stage flip-flops $1a01$~$1a32$, 16 pieces of second-stage flip-flops $1b01$~$1b16$ connected to the first-stage flip-flops $1a01$~$1a16$, an OR gate $1g$, a flip-flop $1h$, a NAND gate $1i$, 16 pieces of data selector circuits $1c01$~$1c16$, 32 pieces of gate circuits $1d01$~$1d32$, and 32 pieces of data output terminals $1f01$~$1f32$. Further, the register access circuit 201 is connected to a CPU circuit 215 through an interruption request circuit Z which is not shown in FIG. 1. The interruption request circuit Z is connected to the register access circuit 201 as shown in FIG. 3, and it receives an interruption request output signal from the register access circuit 201 and outputs it to the CPU circuit 215. Further, as shown in FIG. 3, the interruption request circuit Z is connected to a register circuit 203 which is not shown in FIG. 1.

The first-stage flip-flops $1a01$~$1a32$ constitute a first data holding means of the register access circuit 201, and the second-stage flip-flops $1b01$~$1b16$ constitute a second data holding means of the register access circuit 201. Further, the OR gate $1g$, the flip-flop $1h$, the NAND gate $1i$, and the data selector circuits $1c01$~$1c16$ constitute a data output selecting means of the register.access circuit 201.

Furthermore, the data input terminals $1e01$~$1e32$ and the data output terminals $1f01$~$1f32$ are connected to a 32 bit data bus 218 and a 32-bit data bus 206, respectively.

Figure 1:
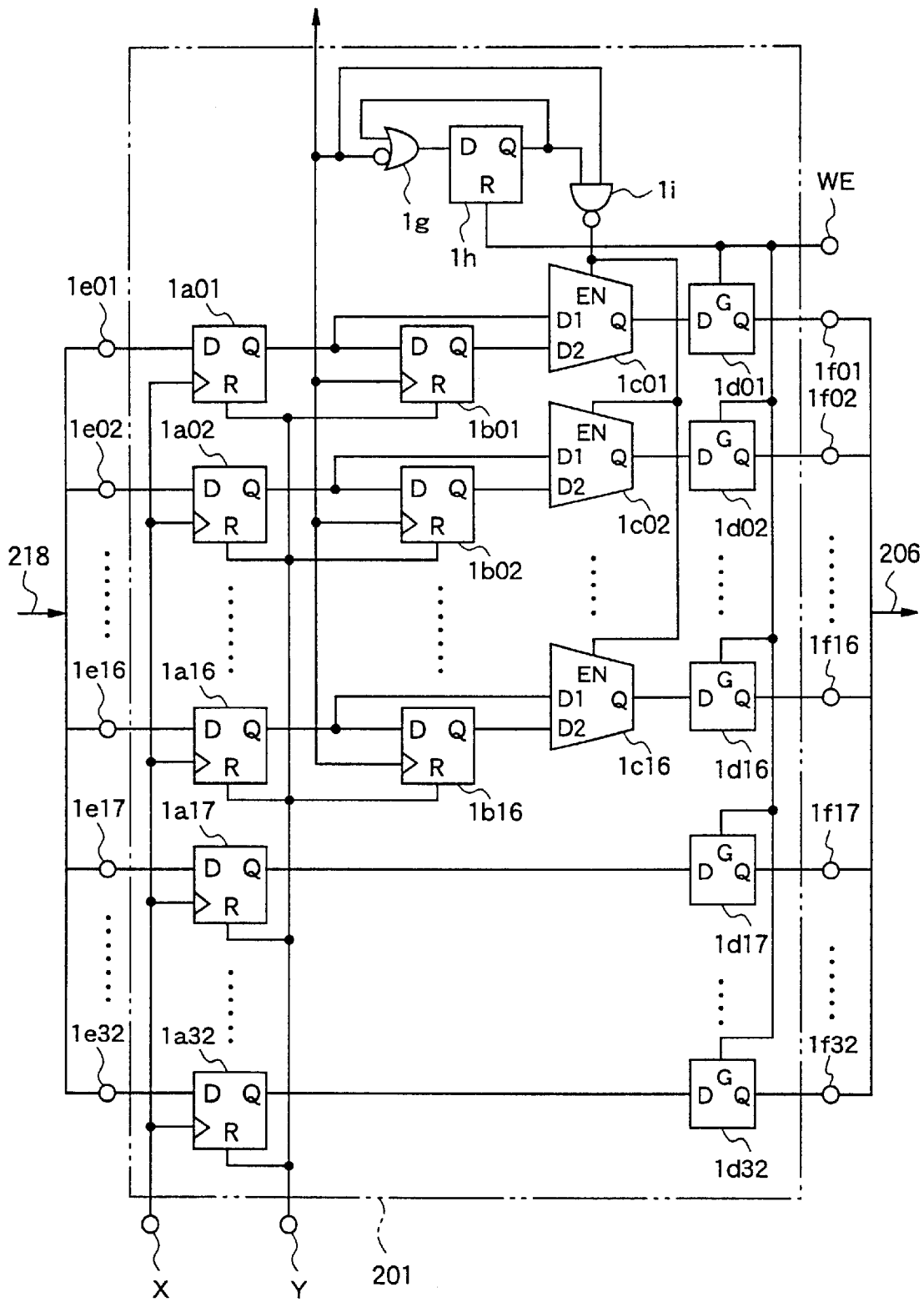
FIG. 1 is a circuit diagram illustrating a register access circuit according to an embodiment of the present invention.

In FIG. 1, to simplify the description, only five flip-flops selected from the 32 pieces of first-stage flip-flops $1a01$~$1a32$ are shown. With respect to other constituents of the register access circuit 201, only those corresponding to the five pieces of first-stage flip-flops are shown.

Hereinafter, the respective constituents of the register access circuit 201 will be described with reference to the figures.

The first-stage flip-flops 1a01~1a16 have data input terminals D respectively connected to the external data input terminals 1e01~1e16, data output terminals Q respectively connected to the data input terminals D of the second-stage flip-flops 1b01~1b16, reset terminals R connected to a reset signal output terminal Y, and clock terminals connected to a clock signal output terminal X.

Further, the first-stage flip-flops 1a17~1a32 have data input terminals D respectively connected to the external data input terminals 1e17~1e32, data output terminals Q respectively connected to the data input terminals D of the gate circuits 1d17~1d32, reset terminals R connected to the reset signal output terminal Y, and clock terminals connected to the clock signal output terminal X.

Each of the first-stage flip-flops 1a01~1a32 has a function to hold data given to its data input terminal D. Accordingly, the first-stage flip-flops 1a01~1a32 function as a 32-bit first data holding means.

Further, 32 lines connecting the external data input terminals 1e01~1e32 with the first-stage flip-flop's 1a01~1a32 constitute a first bus line having an internal bus width of 32 bits.

The second-stage flip-flops 1b01~1b16 have data input terminals D which are respectively connected to the data output terminals Q of the first-stage flip-flops 1a01~1a16 and to the input terminals D1 of the selector circuits 1c01~1c16, data output terminals Q respectively connected to the input terminals D2 of the selector circuits 1c01~1c16, reset input terminals R connected to the reset signal output terminal Y, and clock terminals connected to the interruption request circuit Z which is not shown in FIG. 1.

Each of the second-stage flip-flops 1b01~1b16 has a function to hold data given to its data input terminal D. Accordingly, the second-stage flip-flops 1b01~1b16 function as a 16-bit second data holding means.

Figure 5:
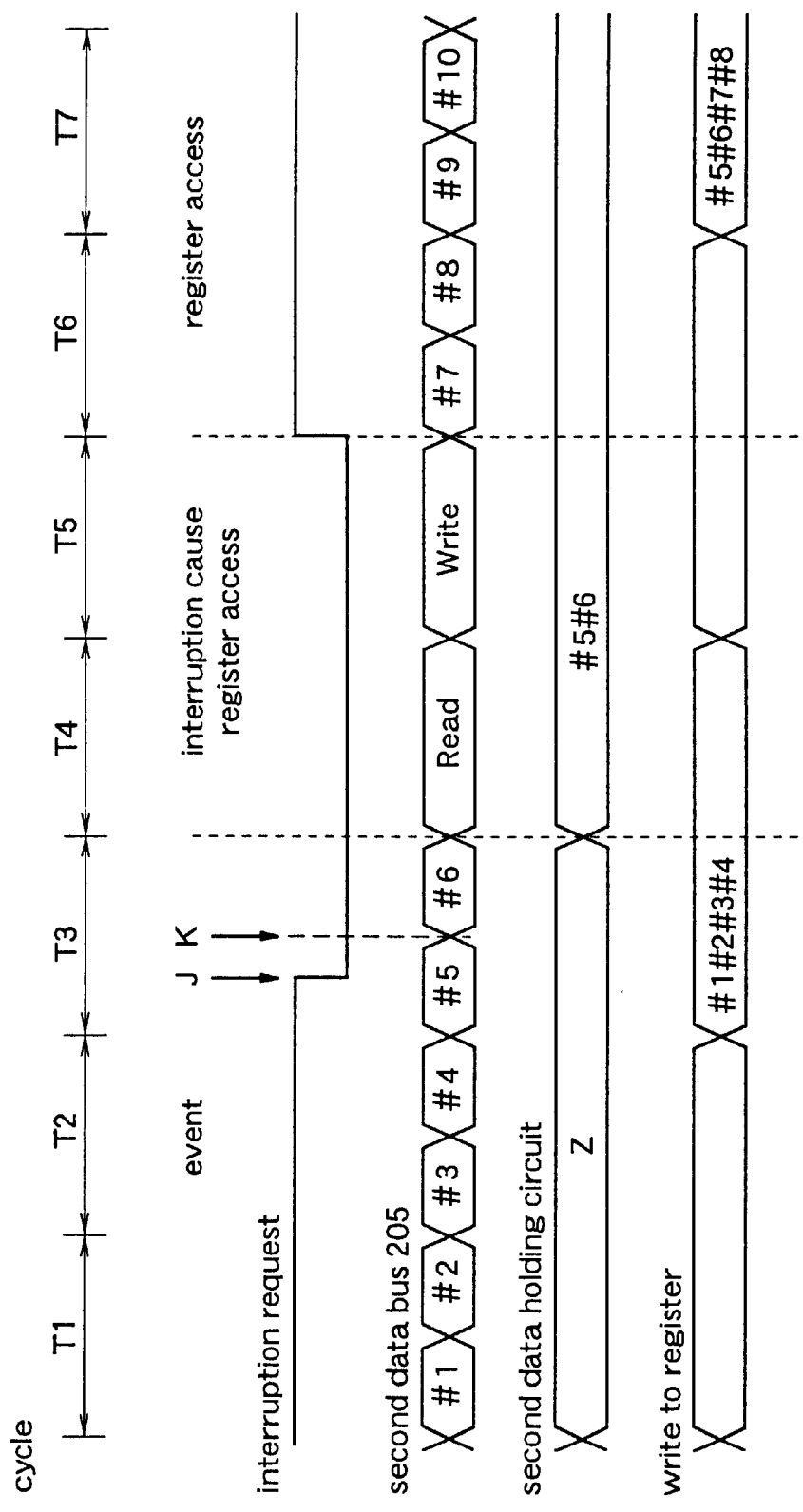
FIG. 5 is a timing chart relating to the data processing method using the register access circuit according to the present invention.
Figure 6:
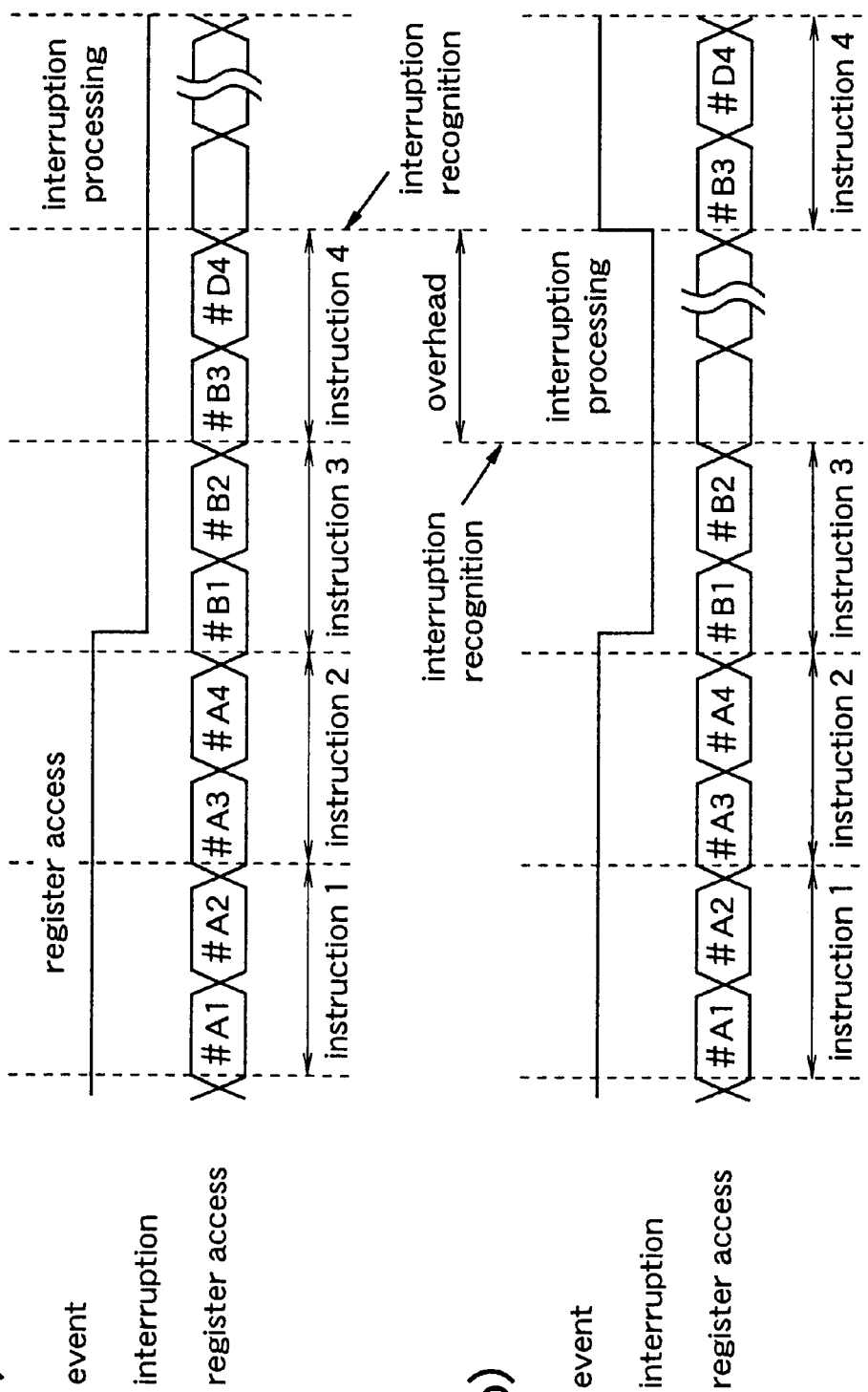
FIGS. 6(a) and 6(b) are diagrams for explaining overhead in firmware.

Each of the clock terminals of the second-stage flip-flops 1b01~1b16 is constructed so as to operate at the falling edge of the interruption request signal from the interruption request circuit Z as shown in FIG. 5. This operation will be described later.

Further, 16 lines connecting the first-stage flip-flops 1a01~1a16 with the second-stage flip-flops 1b01~1b16 constitute a second bus line having an internal bus width of 16 bits.

The data selector circuits 1c01~1c16 have data input terminals D1 respectively connected to the data output terminals Q of the first-stage flip-flops 1a01~1a16, data input terminals D2 respectively connected to the data output terminals Q of the second-stage flip-flops 1b01~1b16, a control signal terminal EN connected to the data output terminal of the NAND circuit 1i, and data output terminals Q respectively connected to the input terminals D of the gate circuits 1d01~1d16. Each of the data selector circuit 1c01~1c16 is constructed so as to select a required flip-flop from the second-stage flip-flops 1b01~1b16 during a period from the rising edge of an interruption signal output of a control signal from the interruption request circuit Z (not shown) which is applied through the NAND circuit 1i to the control signal terminal EN to the rising edge of a signal from the write control signal output terminal WE to the register circuit 203 (not shown). That is, the data selector circuits 1c01~1c16 select required data from the data possessed by the second-stage flip-flops 1b01~1b16.

The gate circuits 1d01~1d16 have data input terminals D connected to the output terminals Q of the data selector circuits 1c01~1c16, data output terminals Q connected to the data output terminals 1f01~1f16, and control terminals G connected to the write control signal output terminal WE. The gate circuits 1d17~1d32 have data input terminals D connected to the data output terminals Q of the first-stage flip-flops 1a17~1a32, data output terminals Q connected to data output terminals 1f17~1f32, and control terminals G connected to the write control signal output terminal WE. The gate circuits 1d01~1d32 function as a circuit for outputting a write enable signal by which the CPU 215 (not shown) writes data in the register circuit 203 (not shown).

The OR gate 1g has an input terminal connected to the interruption request circuit Z (not shown), an input terminal connected to the data output terminal Q of the flip-flop 1h, and a data output terminal connected to the data input terminal D of the flip-flop 1h.

The flip-flop 1h has a data input terminal D connected to the output terminal of the OR gate 1g, a data output terminal Q connected to the input terminal of the NAND gate 1i, and a reset terminal R connected to the write control signal output terminal WE.

The NAND gate 1i has an input terminal connected to the interruption request circuit Z (not shown), an input terminal connected to the data output terminal Q of the flip-flop 1h, and a data output terminal connected to the write control signal terminals EN of the data selector circuits 1c01~1c16.

Figure 2:
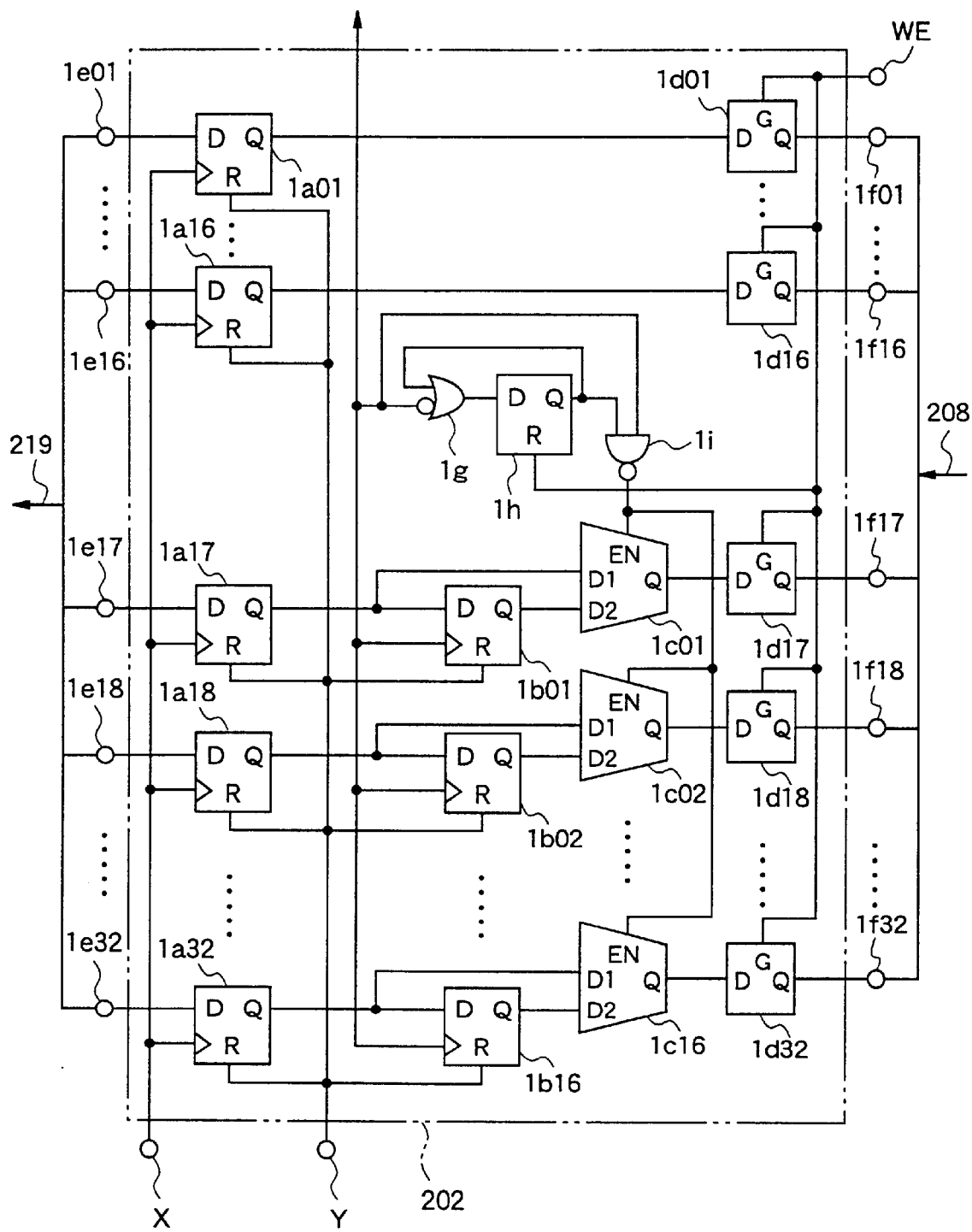
FIG. 2 is a circuit diagram illustrating a register access circuit according to another embodiment of the present invention.

A register access circuit 202 shown in FIG. 2 is different from the above-described register access circuit 201 in that the second-stage flip-flops 1b01~1b16 are connected to the first-stage flip-flops 1a17~1a32 corresponding to the lower 16 bits amongst the first-stage flip-flops 1a01~1a32. That is, the data output terminals Q of the first-stage flip-flops 1a17~1a32 are connected to the data input terminals D of the second-stage flip-flops 1b01~1b16, respectively.

Other constituents of the register access circuit 202 are identical to those of the register access circuit 201 described above.

As shown in FIG. 3, the above-described register access circuits 201 and 202 are included in the LSI 2, and this LSI 2 is connected to the CPU 215 to be used as a microcomputer having the interruption request circuit Z. The microcomputer is constructed so that it rapidly accepts interruption processing indicated by hardware to perform it, i.e., the overhead time until the interruption processing is reduced, thereby providing a data processing method which enables high-speed data transfer and parallel processing between the CPU 215 and the LSI 2, and deals with data deletion.

Hereinafter, this data processing method will be described. First of all, a description will be given of a system comprising the LSI 2 including the register access circuits 201 and 202, the CPU 215, and the interruption request circuit Z, with reference to FIG. 3.

Turning to FIG. 3, the microcomputer comprises the LSI 2 and the CPU circuit 215. The LSI 2 comprises a write register access circuit 201, a read register access circuit 202, a register circuit 203, a CPU circuit 204, 8-bit internal data buses 205 and 207, 32-bit internal data buses 206, 208, 218 and 219, a bidirectional address bus 209, and switch means 216 and 217 for changing the bus width.

Hereinafter, the respective constituents of the LSI 2 will be described with reference to FIG. 3.

The write register access circuit 201 is constructed such that data from the CPU circuit 204 is input to the write register access circuit 201 through the 8-bit internal data bus 205, the switch means 216, and the data bus 218, and the data from the register access circuit 201 is output to the register circuit 203 through the 32-bit internal data bus 206.

To be specific, the data from the UPU circuit 204 is input to the write register access circuit 201 by that the 8 data lines constituting the 8-bit internal data bus 205 make four times of accesses to the data input terminal 1e01~1e32 of the write register access circuit 201.

Figure 4:
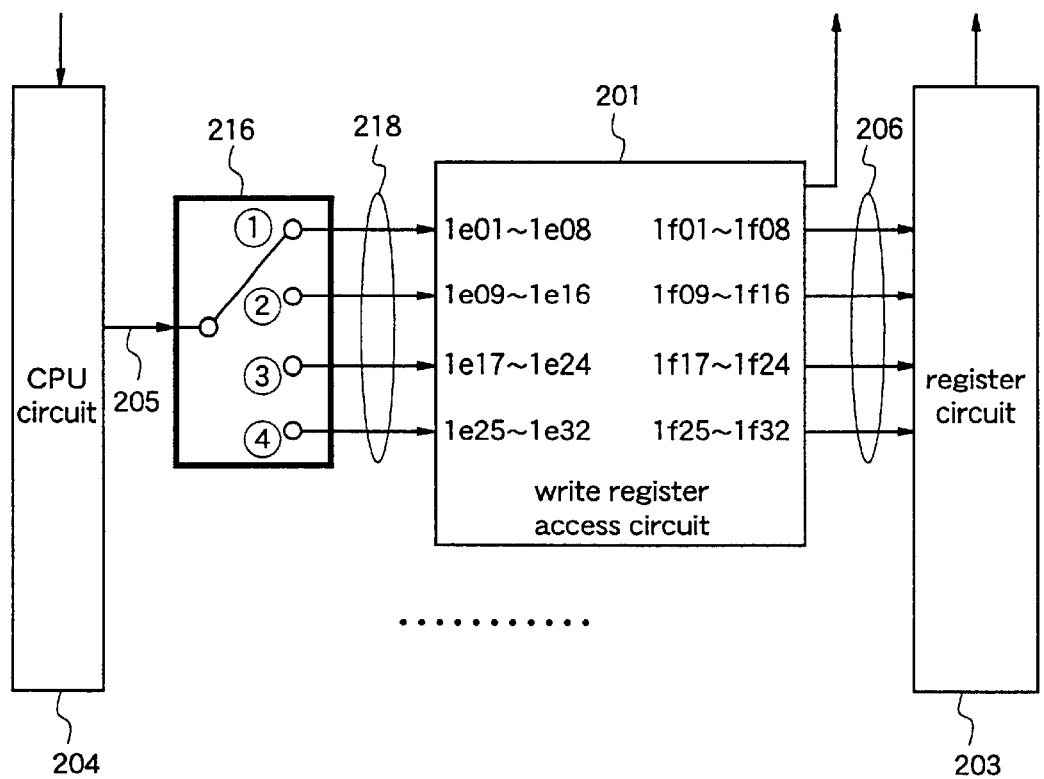
FIG. 4 is a diagram illustrating how the register access circuit according to the present invention is connected.

That is, when the initial 8 bits of data are input to the switch means 216, the switch means 216 selects the first terminal as shown in FIG. 4 to output the data to the data bus 218. This first terminal is connected to the data input terminals 1e01~1e08 of the write register access circuit 201. When the next 8 bits of data are input to the switch means 216, the switch means 216 selects the second terminal to transmit the data through the data bus 218 to the data input terminals 1e09~1e16. Likewise, the next 8 bits of data are transmitted through the third terminal of the switch means 216 to the data input terminals 1e17e24, and then the next 8 bits of data are transmitted through the fourth terminal to the data input terminals 1e25~1e32, whereby 32 bits of data are input to the write register access circuit 201.

Next, these data input to the write register access circuit 201 are transmitted to the register circuit 203 by that the 32 data lines constituting the 32-bit internal data bus 206 make one access to the data output terminals 1f01~1f32 of the write register access circuit 201. Please The read register access circuit 202 is constructed such that the data from the register circuit 203 are input to the read register access circuit 202 through the 32-bit internal data bus 208, and the data from the read register access circuit 202 are output to the CPU circuit 204 through the data bus 219, the switch means 217, and the 8-bit internal data bus 207.

To be specific, the data from the register circuit 203 are input to the read register access circuit 202 by that the 32 data lines constituting the 32-bit internal data bus 208 make one access to the data output terminal 1f~01~1f32 of the register access circuit 202.

Next, the data input to the read register access circuit 202 are transmitted to the CPU circuit 204 by that the 8 data lines constituting the 8-bit internal data bus 207 make four times of accesses to the data input terminals 1e01~1e32 of the read register access circuit 202 through the data bus 219 and the switch means 217. The four times of access are identical to those described with respect to the switch means 216 and, therefore, so not require repeated description.

The register circuit 203 is connected to the read and write register access circuits 201 and 202 through the 32-bit internal data bus 206 and the 32-bit internal data bus 208, respectively, and furthermore it is connected directly to the CPU circuit 204 through the bidirectional address bus 209 having 8 data lines. The address data of the write register access circuit 201 are decoded to be written in the data in the register circuit 203 through the 32-bit internal data bus 206, and the data in the resister circuit 203 are output to the 32-bit internal data bus 208.

The CPU circuit 204 is connected to the following buses: the 8-bit internal data bus 205 connected to the write register access circuit 201, the 8-bit internal data bus 207 connected to the read register access circuit 202, the bidirectional address bus 209 connected to the register circuit 203, the bidirectional data bus 210 having 8 data lines connected to the CPU circuit 215, and the bidirectional address bus 211 connected to the CPU circuit 215. The CPU circuit 204 receives a write enable signal 212 and a read enable signal 213 from the CPU circuit 215. Further, the CPU circuit 204 and the CPU circuit 215 exchange data via the bidirectional data bus 210.

The CPU circuit 215 is connected as follows to the LSI 2 constructed as described above. The CPU circuit 215 is connected to the bidirectional data bus 210 through which it exchanges data with the CPU circuit 204, and the bidirectional address bus 211 connected to the CPU circuit 204. The CPU circuit 215 outputs a write enable signal 212 and a read enable signal 213 to the CPU circuit 204. Further, the CPU circuit 215 receives an interruption request signal output from the interruption request circuit Z connected to the register access circuit 201 and 202 as shown in FIGS. 1 and 2. Further, the CPU circuit 215 forms data to clear the request of the interruption request circuit Z, and gives this data to the register circuit 203 through the bidirectional data bus 210 and the like.

Next, a description will be given of the operation of the LSI 2 connected to the CPU circuit 215, the operations of the write and read register access circuits 201 and 202 included in the LSI 2, and the data transfer timings when interruption requests are generated in the system constituted by the CPU circuit 215, the LSI 2, and the interruption request circuit Z, with reference to a timing chart shown in FIG. 5 and the schematic block diagram of the system shown in FIG. 3.

Initially, in cycle T1, data #1 and #2 are transmitted from the second data bus 205 to the first-stage flip-flops 1a01~1a16 corresponding to the upper 16 bits of the first data holding means.

Next, in cycle T2, data #3 and #4 are transmitted from the second data bus 205 to the first-stage flip-flops 1a17~1a32 corresponding to the lower 16 bits of the first data holding circuit.

Next, in cycle T3, the 32 bits of data #1~#4 are written in the register circuit 203. At the same time, data #5 and #6 are transmitted from the second data bus 205 to the first-stage flip-flops 1a01~1a16 corresponding to the upper 16 bits of the first data holding circuit. It is now assumed that interruption of "Read" operation is generated asynchronously at J shown in FIG. 5.

Next, in cycle T4, the interruption of "Read" operation is recognized. At this time, the data #5 and #6 which have been written in cycle T3 are temporarily saved in the second-stage flip-flops 1b01~1b16 as the second data holding circuit, whereby these data #5 and #6 are prevented from being erased by overwrite performed on these data #5 and #6 in the first data holding circuit. The interruption is recognized in units of 16 bits because the instruction word length of the CPU is 16 bits in this embodiment. However, data transfer is performed in 8-bit mode and, therefore, 16 bits of data are transferred in two parts, a that is, 8 bits at a time. Further, since a 16-bit microcomputer is employed in this embodiment, interruption is latched every 16 bits. So, for example, interruption is never latched at a position indicated by K in FIG. 5.

Next, in cycle T5, the register is cleared by the "Write" operation.

Next, in cycle T6, data #7 and #8 are transmitted from the second data bus 205 to the first-stage flip-flops 1a17~1a32 corresponding to the lower 16 bits of the first data holding circuit. Allocation of data to the upper-bit flip-flops or the lower-bit flip-flops is appropriately controlled so that the data can be transferred in units of 32 bits.

In cycle T7, the 32 bits of data #5~#8 are written in the register circuit 203.

In this way, whether an interruption request is generated or not, 8 bits of data can be appropriately stored in the 32-bit wide register.

Next, a description will be given of the data processing method in this system. This data processing method includes a first step in which, when the interruption request circuit Z outputs an interruption request signal to the CPU circuit 215, data held in the first-stage flip-flops 1a01~1a16 which are the first data holding means in the write and read register access circuits 201 and 202 inside the LSI 2 are given to the second-stage flip-flops $1b01$~$1b16$ which are the second data holding means; and a second step in which, when the CPU circuit 215 completes interruption processing, the data held by the second-stage flip-flops $1b01$~$1b16$ and part of data held by the first-stage flip-flops $1a17$~$1a32$ are composited to be output.

To be specific, when the interruption request signal is input to the CPU circuit 215 after the CPU 215 has started data processing, the data which have been written in the LSI 2 until interruption processing is started are held in the first step, followed by interruption processing by the CPU circuit 215. When the interruption processing is completed, in the second step, the data which have been held and the data written in the LSI 2 after the interruption processing are composited to be output. In this way, this system prevents the data in the LSI 2 from being erased.

Hereinafter, it is assumed that the first-stage flip-flops $1a01$~$1a32$ and the second-stage flip-flops $1b01$~$1b16$, which are constituents of the write and read register access circuits 201 and 202, are initialized by a reset signal supplied from the reset signal output terminal Y.

First of all, when a write request instruction having an instruction word length of 16 bits is issued from the CPU circuit 215 to the LSI 2 having an internal bus of 32 bits, the CPU circuit 215 outputs a write enable signal 212 to the CPU circuit 204 connected to the CPU circuit 215, and outputs initial 8 bits of data to the bidirectional data bus 210 connected to the CPU circuit 204 and to the bidirectional address bus 211 connected to the CPU circuit 204. The initial 8 bits of data input to the CPU circuit 204 are transmitted through the 8-bit internal data bus 205 to the first-stage flip-flops $1a01$~$1a08$ of the write register access circuit 201. In FIG. 4, the switch means 216 selects the first terminal, and this terminal is connected to the data input terminals $1e01$~$1e08$.

Next, the residual 8 bits of data are output from the CPU circuit 215 to the bidirectional data bus 210 connected to the CPU circuit 204 and to the bidirectional address bus 211 connected to the CPU circuit 204. Thereafter, in like manner as described above, 8 bits of data are input to the first-stage flip-flops $1a09$~$1a16$ of the register access circuit 201. In FIG. 4, the switch means 216 selects the second terminal, and this terminal is connected to the data input terminals $1e09$~$1e16$.

When the data are supplied from the write register access circuit 201 in the LSI 2 to the interruption request circuit Z in this stage, the output signal from the interruption request circuit Z is changed from "1" to "0", whereby an interruption request output signal is output to the CPU circuit 215. On receipt of the interruption request output signal, the CPU circuit 215 recognizes that an interruption cause is generated in any circuit.

In this stage, the first step of the data processing method according to the invention is carried out. Hereinafter, the first step will be described in more detail. When the interruption request circuit Z outputs an interruption request signal, in the write register access circuit 201, a reverse signal of the interruption request output signal to the CPU circuit 215 is input to the OR gate $1g$. That is, "1" is input to the OR gate $1g$. So, "1" is input to the data input terminal D of the flip-flop $1h$ connected to the output signal from the OR gate, and "1" is output from the data output terminal Q of the flip-flop $1h$.

When the interruption request signal is output, the second-stage flip-flops $1b01$~$1b16$ receive the data output from the first-stage flip-flops $1a01$~$1a16$ to hold the values. Further, "0" is input to the NAND gate $1i$ connected to the interruption request signal to the CPU circuit 215, and "0" is output from the NAND gate $1i$. Since "0" is input to the control signal terminals EN of the selector circuits $1c01$~$1c16$ connected to the NAND gate $1i$, the data from the first-stage flip-flops $1a01$~$1a32$ are output to the gate circuits $1d01$~$1d32$. Meanwhile, the second-stage flip-flops $1b01$~$1b16$ serving as a 16-bit data holding circuit hold the data output from the first-stage flip-flops $1a01$~$1a16$.

When the first step is completed, the CPU circuit 215 reads data from the interruption cause register to specify the circuit where the interruption cause is generated.

The interruption cause register is a register to make the CPU recognize the status of the hardware, and the CPU performs an appropriate process on the hardware in accordance with information stored in the register.

Initially, the CPU circuit 215 having an instruction word length of 16 bits accesses the interruption cause register by using two (first and second) instructions.

Initially, by the first instruction, the CPU circuit 215 reads 16 bits of data from 32 bits of data possessed by the data output terminals $1e01$~$1e32$ of the read register access circuit 202. In order to read the interruption cause register, the CPU 215 accesses a predetermined address of the register circuit 203 of the LSI 2 connected to the interruption cause register. For this purpose, the CPU circuit 215 outputs a read enable signal 213 to the LSI 2, and outputs an address of the interruption cause register to the bidirectional address bus 211.

Next, the CPU circuit 204 receives the address output from the CPU circuit 215, and outputs it to the bidirectional address bus 209.

Next, the register circuit 203 outputs the 32 bits of data through an address decoder (not shown) included in it, to supply the data through the 32-bit internal data bus 208 to the data input terminals $1e01$~$1e32$ of the read register access circuit 202 connected to the 32 data lines.

Next, the gate circuits $1d01$~$1d32$ in the read register access circuit 202 go into the ON states in response to the read enable signal 213 from the CPU circuit 215, thereby electrically conducting the data output from the selector circuits $1c01$~$1c16$ in the read register access circuit 202 and the data at the output terminals Q of the first-stage flip-flops $1a01$~$1a16$ in the read register access circuit 202. These data are output to the data output terminals $1d01$~$1d32$ in the read register access circuit 202.

Then, the data in the read register access circuit 202 are output to the 8-bit internal bus 207 and, thereafter, output through the CPU circuit 204 to the 8-bit bidirectional data bus 210.

In the above-described process steps, since only a half of the first instruction (i.e., to read 16 bits of data) is executed, the CPU circuit 215 outputs a read enable signal 213 to the LSI 2 to read the residual 8 bits of data. Then, the residual 8 bits of data are read through process steps similar to those described above.

When the first instruction has been executed as described above, the second instruction is executed to read 16 bits of data at the data output terminals $1e01$~$1e16$ of the read register access circuit 202. This data reading is carried out in the same manner as described above.

By executing the above-mentioned two instructions, the CPU circuit 215 reads all of the data stored in the interruption cause register, and analyzes these data to specify a circuit where the interruption cause is generated.

Thereafter, the CPU circuit 215 decides whether or not the specified interruption cause has priority to the process which is currently performed by the LSI 2. When the priority of the specified interruption cause is higher than that of the process being executed by the LSI 2, the CPU circuit 215 inserts interruption processing in the process being executed by the LSI 2. When the interruption processing has ended, the CPU circuit 215 starts the operation to clear the interruption cause register in the register circuit 203.

Initially, by the first one instruction to clear the interruption cause register, 16 bits of data are generated in the CPU circuit 215, and a write enable signal 212 is output from the CPU circuit 215 to the LSI 2 and, further, the 16 bits of clear data generated in the CPU circuit 215 are written in the 16-bit register circuit (not shown) in the CPU circuit 215.

Subsequently, the CPU circuit 215 outputs the 16 bits of clear data to the bidirectional data bus 210.

Next, the clear data in the bidirectional data bus 210 are output to the 8-bit internal data bus 205 through the CPU circuit The clear data are output from the 8-bit internal data bus 205 to the data input terminals 1e01~1e08 of the write register access circuit 201 which are connected to the 8 data lines of the 8-bit internal data bus 205. This will be described with reference to FIG. 4. When there is no interruption request, all of the 32 bits of data are flowed by successively selecting the terminal to be connected in the switch means 216, starting from the first terminal, followed by the second, third, and fourth terminals in this order. However, when an interruption request is generated, the data which have already been flowed through the data input terminals 1e01~1e16 into the first-stage flip-flops 1a01~1a16 by selecting the first terminal and the second terminal in this order, are once saved in the second-stage flip-flops 1b01~1b16 and, thereafter, the first terminal is again selected to flow the data to the data input terminals 1e01~1e08. In this case, the switching in the switch means 216 and the like are as described above.

Then, the residual 8 bits of data are also output to the bidirectional data bus 210 simultaneously with outputting a write enable signal 212 from the CPU circuit 215 to the LSI 2, and subjected to the same process as described above to be output to the data input terminals 1e09~1e16 of the write register access circuit 201. The operation of the switch means 216 and the like are as described above.

At this time, although the data written in the data input terminals 1e01~1e32 of the register access circuit 201 before interruption processing are deleted, this deletion causes no problem because the same data are stored in the second-stage flip-flops 1b01~1b16 of the write register access circuit 201.

By the next one instruction, the CPU circuit 215 forms 16 bits of clear data, and outputs the 16 bits of clear data through the CPU circuit 204 to the data input terminals 1e01~1e32 of the write register access circuit 201 in like manner as described above.

When the 32 bits of clear data are thus stored in the write register access circuit 201, the write enable signal 212 to the register circuit 203 is output from the CPU circuit 215 to the LSI 2, whereby the 32 bits of clear data are output from the gate circuits 1d01~1d32 of the write register access circuit 201 through the 32-bit internal data bus 206 to the register circuit 203.

The interruption cause register is cleared in this way, whereby the interruption request circuit Z changes the output signal from "0" to "1".

As the result, the data input to the OR gate 1g connected to the reverse signal from the interruption request circuit changes from "1" to "0", but the input signal to the OR gate 1g connected to the output terminal Q of the flip-flop 1h is "1". So, the output signal from the flip-flop does not change, i.e., it remains "1".

Further, the NAND gate 1i receives "1" output from the output terminal Q of the flip-flop 1h, and "1" output from the interruption cause output terminal. Therefore, the output from the NAND gate 1i is "1".

With the change of the output from the NAND gate 1i from "0" to "1", the outputs from the selector circuits 1c-1~1c16 of the write register access circuit 201 change to the outputs of the second-state flip-flops 1b01~1b16 of the write register access circuit 201.

In this way, the operation to clear the interruption cause register in the register circuit 203 is completed.

When the interruption processing in the above-described main routine has ended and the interruption cause register has been cleared, the CPU circuit 215 returns to the access routine to the register circuit.

In this stage, the second step in the data processing method of the present invention takes place.

Hereinafter, the second step will be described specifically. Since 16 bits of data have been written by the first instruction, the residual 16 bits of data are written by the next one instruction. As in the process performed with respect to the first instruction, the residual 16 bits of data are output through the CPU circuit 204 to the 8-bit internal data bus 205, and the data are input to the 16-bit data input terminals 1e17~1e32. In the switch means 216, the third terminal is selected to flow the first 8 bits of data, and then the fourth terminal is selected to flow the residual 8 bits of data.

When 32 bits of data are stored, in response to the write enable signal 212 supplied from the CPU circuit 215 to the register circuit 203, the gate circuits 1d01~1d32 of the write register access circuit 201 transmit the data, whereby the output data from the selector circuits 1c01~0c16 of the write register access circuit 201 and the output data from the first-stage flip-flops 1a17~1a32 of the write register access circuit 201, i.e., 32 bits of data in total, are transmitted through the 32-bit internal data bus 206 to the register circuit 203.

Since the flip-flop 1h of the write register access circuit 201 is reset at the rising edge of a signal from the write enable signal terminal WE to the register connected to the reset terminal R of the flip-flop 1h, the output from the flip-flop 1h becomes "0" and, accordingly, the output from the NAND gate 1i becomes "0" and the EN signal to the selector circuits 1c01~1c16 also becomes "0". Therefore, the input signals to the gate circuits 1d01~1d32 become the outputs from the first-stage flip-flops 1a01~1a32.

When the second step is completed in this way, the data processing method of the present invention is completed.

Since the write and read register access circuits 201 and 202 of the present invention operate as described above to process data, an LSI provided with the write and read register access circuits 201 and 202 can prevent data in the LSI from being erased by the interruption processing of the CPU even when the instruction word length of the CPU is different from the internal bus width of the LSI. Moreover, when using the write and read register access circuits 201 and 202 of the present invention, accurate register access is realized without the necessity of making the instruction word length of the CPU equal to the bus width of the LSI, providing an internal bus width changing switch, and dealing with the problem at the software end of the CPU. Therefore, the write and read register access circuits 201 and 202 are very favorable.

While in the above description the instruction word length of the CPU 215 is 16 bits, the present invention can be implemented even when the instruction word length is 8 bits.

Further, when making register access according to the data processing method of the register access circuit as described above, no software-wise processing is required when connecting an LSI whose internal bus width is different from the instruction word length of the CPU. Further, when plural stages of the write register access circuits 201 are connected, a plurality of instruction word lengths can be handled, whereby the CPU's access can be performed efficiently.

What is claimed is:

1. A data transfer circuit comprising:
   a first data holding means having a plurality of data holding circuits which have a first bit width;
   a second data holding means having at least one data holding circuit which has a second bit width different from the first bit width, said second data holding means being connected to some of the data holding circuits in said first data holding means; and
   a data output selecting means for selecting data held by some of the data holding circuits in said first data holding means, or data held by the at least one data holding circuit in said second data holding means;
   wherein, when an interruption request signal is asserted to said data transfer circuit, part of the data held by said first data holding means is provided to said second data holding means; and
   wherein, when the interruption request signal is negated, said data output selecting means selects the data of said second data holding means to output the data.

2. The data transfer circuit of claim 1, wherein, when the number of the data holding circuits possessed by said first data holding means is n (n: natural number), the number of the data holding circuits possessed by said second data holding means is one selected from (n/4), (n/2), and (3×n/4).

3. The data transfer circuit of claim 2, wherein the number n of the data holding circuits possessed by said first data holding means is 32.

4. The data transfer circuit of claim 3, wherein the number of the data holding circuits possessed by said second data holding means is 16.

5. A data transfer circuit as claimed in claim 1, wherein said data output selecting means comprises an OR gate, a flip-flop, and a NAND gate.

6. A data transfer circuit as claimed in claim 1, wherein the first bit width of the plurality of data holding circuits of said first data holding means is 32 bits and the second bit width of the plurality of data holding circuits of said second data hold means is 16 bits.

7. A register access circuit comprising:
   32 pieces of first-stage flip-flops;
   16 pieces of second-stage flip-flops connected to 16 pieces of said first-stage flip-flops;
   16 pieces of selector circuits for providing part of data held by said first-stage flip-flops to said second-stage flip-flops;
   a logic gate; and
   32 pieces of gate circuits for selecting data held by some of said first-stage flip-flops or data held by some of said second-stage flip-flops to output the data;
   wherein, when an interruption request signal is asserted to said register access circuit, part of the data held by said first-stage flip-flops is provided to said second-stage flip-flops by using said selector circuits; and
   wherein, when the interruption request signal is negated, said selector circuits select the data held by said second-stage flip-flops and output the data through said gate circuits.

8. A data processing method using a register access circuit, which is employed in a system including:
   a central processing unit;
   a register circuit;
   a register access circuit for accessing the register circuit under control of the central processing unit; and
   an interruption request circuit connected to the central processing unit;
   the register access circuit including:
      a first data holding means having a plurality of data holding circuits;
      a second data holding means having at least one data holding circuit and being connected to some of the data holding circuits in the first data holding means; and
      a data output selecting means for selecting data held by some of the data holding circuits in the first data holding means or data held by some of the data holding circuits in the second data holding means to output the selected data;
   said data processing method comprising:
      a first step of providing part of the data held by the first data holding means to the second data holding means when the interruption request circuit outputs an interruption request signal to the central processing unit; and
      a second step of composition the data held by the second data holding means after said first step with part of the data held by the first data holding means which has not yet been connected to the second data holding means, and outputting the composite data when the central processing unit ends interruption processing according to the interruption request signal.

9. The data processing method using a register access circuit according to claim 8, wherein, when the number of the data holding circuits possessed by the first data holding means in the register access circuit is n (n: natural number), the number of the data holding circuits possessed by the second data holding means is one selected from (n/4), (n/2), and (3×n/4).

10. The data processing method using a register access circuit according to claim 9, wherein the number n of the data holding circuits possessed by the first data holding means in the register access circuit is 32.

11. The data processing method using a register access circuit according to claim 10, wherein the number of data holding circuits possessed by the second data holding means in the register access circuit is 16.

12. A data processing method using a register access circuit which is employed in a system including:
   a central processing unit;
   a register circuit;
   a register access circuit accessing the register circuit under control of the central processing unit; and
   an interruption request circuit connected to the central processing unit;
   the register access circuit including:
      32 pieces of first-stage flip-flops;
      16 pieces of second-stage flip-flops connected to 16 pieces of the first-stage flip-flops;

16 pieces of selector circuits for providing part of data held by the first-stage flip-flops to the second-stage flip-flops;

a logic gate; and 32 pieces of gate circuits for selecting data held by some of the first-stage flip-flops or data held by some of the second-stage flip-flops to output the data;

said data processing method comprising:

a first step of providing part of the data held by the first data holding means to the second data holding means when the interruption request circuit outputs an interruption request signal to the central processing unit; and a second step of composition the data held by the second data holding means after said first step with part of the data held by the first data holding means which has not yet been connected to the second data holding means, and outputting the composite data when the central processing unit ends interruption processing according to the interruption request signal.

13. A data transfer circuit comprising:

a first data holding device having a plurality of data holding circuits which have a first bit width;

a second data holding device having at least one data holding circuit which has a second bit width different the first bit width, said second data holding device being connected to some of the data holding circuits of said first data holding device; and a data output selecting device operable to select data held by some of the data holding circuits of said first data holding device, or data held by the at least one data holding circuit of said second data holding device;

wherein, when an interruption request signal is asserted to said data transfer circuit, part of the data held by said first data holding device is provided to said second data holding device; and wherein, when the interruption request signal is negated, said data output selecting device selects the data of said second data holding device to output the data.

14. The data transfer circuit of claim 13, wherein, when the number of the data holding circuits of said first data holding device is n (n: natural number), the number of the data holding circuits of said second data holding device is one selected from (n/4), (n/2), and (3×n/4).

15. The data transfer circuit of claim 14, wherein the number n of the data holding circuits of said first data holding device is 32.

16. The data transfer circuit of claim 15, wherein the number of the data holding circuits of said second data holding device is 16.

17. A register access circuit comprising:

32 first-stage flip-flops;

16 second-stage flip-flops connected to 16 of said first-stage flip-flops;

16 selector circuits operable to provide part of data held by said first-stage flip-flops to said second-stage flip-flops;

a logic gate; and 32 gate circuits operable to select data held by some of said first-stage flip-flops or data held by some of said second-stage flip-flops to output the data;

wherein, when an interruption request signal is asserted to said register access circuit, part of the data held by said first-stage flip-flops is provided to said second-stage flip-flops by using said selector circuits; and wherein, when the interruption request signal is negated, said selector circuits select the data held by said second-stage flip-flops and output the data through said gate circuits.

18. A data processing method using a register access circuit which is employed in a system including:

a central processing unit;

a register circuit;

a register access circuit operable to access the register circuit under control of the central processing unit; and an interruption request circuit connected to the central processing unit;

the register access circuit including:

a first data holding device having a plurality of data holding circuits;

a second data holding device having at least one data holding circuit and being connected to some of the data holding circuits of the first data holding device; and a data output selecting device operable to select data held by some of the data holding circuits in the first data holding device or data held by some of the data holding circuits in the second data holding device to output the selected data;

said data processing method comprising:

providing part of the data held by the first data holding device to the second data holding device when the interruption request circuit outputs an interruption request signal to the central processing unit; and composition the data held by the second data holding device, after said providing, with part of the data held by the first data holding device which has not yet been connected to the second data holding device, and outputting the composite data when the central processing unit ends interruption processing according to the interruption request signal.

19. The data processing method using a register access circuit according to claim 18, wherein, when the number of the data holding circuits of the first data holding device in the register access circuit is n (n: natural number), the number of the data holding circuits of the second data holding device is one selected from (n/4), (n/2), and (3×n/4).

20. The data processing method using a register access circuit according to claim 19, wherein the number n of the data holding circuits of the first data holding device in the register access circuit is 32.

21. The data processing method using a register access circuit according to claim 20, wherein the number of data holding circuits of the second data holding device in the register access circuit is 16.

22. A data processing method using a register access circuit which is employed in a system including:

a central processing unit;

a register circuit;

a register access circuit operable to access the register circuit under control of the central processing unit; and an interruption request circuit connected to the central processing unit;

the register access circuit including:

32 first-stage flip-flops;

16 second-stage flip-flops connected to 16 of the first-stage flip-flops;

16 selector circuits operable to provide part of data held by the first-stage flip-flops to the second-stage flip-flops;

a logic gate; and 32 gate circuits operable to select data held by some of the first-stage flip-flops or data held by some of second-stage flip-flops to output the data;

said data processing method comprising:

providing part of the data held by the first data holding device to the second data holding device when the interruption request circuit outputs an interruption request signal to the central processing unit; and composition the data held by the second data holding device, after said providing, with part of the data held by the first data holding device which has not yet been connected to the second data holding device, and outputting the composite data when the central processing unit ends interruption processing according to the interruption request signal.

23. A data transfer circuit as claimed in claim 13, wherein said data output selecting device comprises an OR gate, a flip-flop, and a NAND gate.

24. A data transfer circuit as claimed in claim 13, wherein the first bit width of the plurality of data holding circuits of said first data holding device is 32 bits and the second bit width of the plurality of data holding circuits of said second data hold device is 16 bits.

* * * * *